United States Patent [19]
Melchior et al.

[11] 4,089,173
[45] May 16, 1978

[54] SUPERCHARGED INTERNAL COMBUSTION ENGINES

[75] Inventors: Jean Melchior; Thierry André, both of Paris, France

[73] Assignee: Etat Francais, Paris, France

[21] Appl. No.: 615,775

[22] Filed: Sep. 22, 1975

[30] Foreign Application Priority Data
Apr. 24, 1975 France .............................. 75 12742

[51] Int. Cl.² ............................................. F02D 23/00
[52] U.S. Cl. ........................................ 60/606; 60/598
[58] Field of Search ................. 60/606, 598, 599, 605, 60/606, 615, 614, 617, 619

[56] References Cited
U.S. PATENT DOCUMENTS
2,633,698  4/1953  Nettel ..................................... 60/606

FOREIGN PATENT DOCUMENTS
864,443  4/1941  France ..................................... 60/606

Primary Examiner—Ronald H. Lazarus
Attorney, Agent, or Firm—Barnes, Kisselle, Raisch & Choate

[57] ABSTRACT

A diesel engine is supercharged by a compressor driven by a turbine which receives the exhaust gas of the engine. A bypass pipe permits the air delivered by the compressor and not taken by the engine to flow to the turbine. Means for impressing to the air flow in the by-pass a pressure drop which is substantially independent of the rate of flow and increases when the output pressure of the compressor increases comprises an air balanced throttle member in the by-pass and separate control means.

17 Claims, 10 Drawing Figures

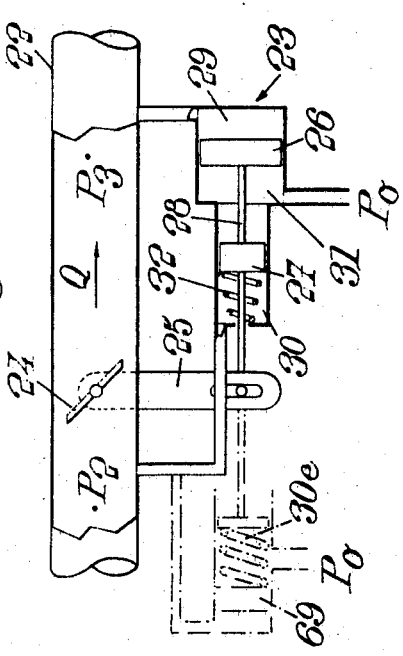
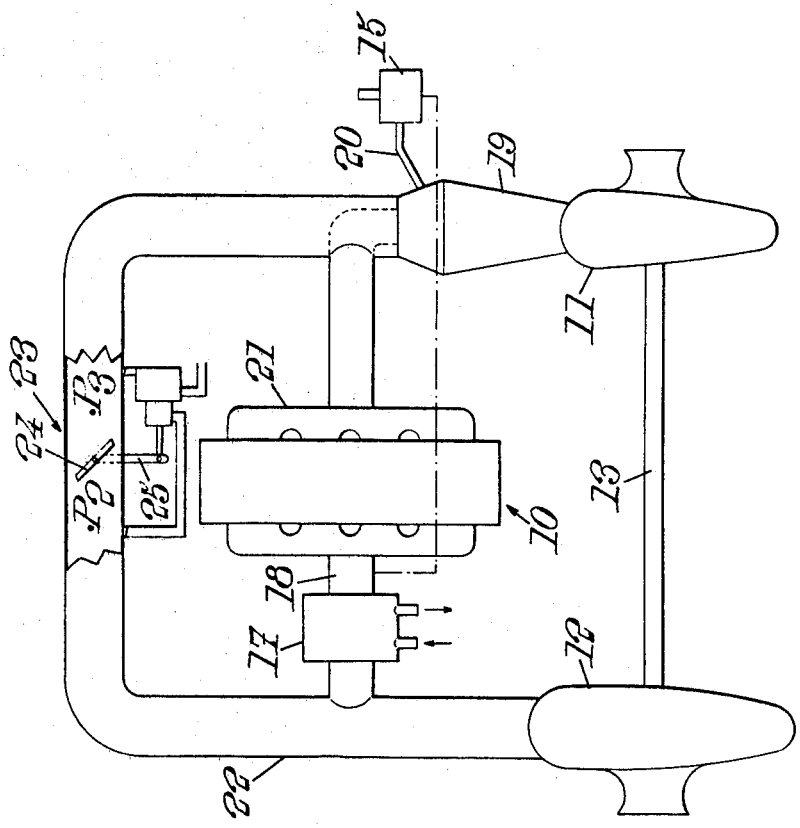

SUPERCHARGED INTERNAL COMBUSTION ENGINES

CROSS REFERENCES TO RELATED PATENT APPLICATIONS

The present invention discloses and claims subject matter part of which was disclosed but not claimed in U.S. Pat. application Ser. No. 437,748, filed Jan. 29, 1974, now U.S. Pat. No. 3,988,894, and in U.S. Pat. application Ser. No. 562,961, filed Mar. 28, 1975, now U.S. Pat. No. 4,026,115 both assigned to the assignee of the present invention.

BACKGROUND OF THE DISCLOSURE

The invention relates to power units comprising the internal combustion engine, particularly a Diesel engine, supercharged by a turbocompressor unit comprising at least one compressor and at least one turbine receiving the engine exhaust gases, at least one by-pass pipe through which the air delivered by the compressor and which is not taken by the engine can flow towards the turbine, and throttle means in the by-pass pipe with a variable cross section and arranged to generate a pressure difference which is an increasing function of the pressure in the by-pass pipe and is substantially independent of the flow rate through the pipe. All the air not absorbed by the engine is then transmitted through the by-pass pipe from the compressor to the turbine.

The pressure difference provides for scavenging of the engine, which is essential in the case of two-stroke engines, which is necessary for cooling the valves and cylinder head in wide-bore four stroke engines and which is useful for discharging residual gases, all the more if the volumetric ratio of the engine is smaller. Since the pressure difference is independent of the flow rate (i.e. of the engine speed when the unit operates at a given power), the relation between the pressure ratio of the compressor and the expansion ratio in the turbine is independent of the engine speed and the compressor can be operated very near the surge line, in a high-efficiency region.

A unit of that kind is disclosed and claimed in the copending patent application Ser. No. 721,576 filed Sept. 8, 1976 as a division of patent application Ser. No. 437,748, filed Jan. 29, 1974 in the name of Jean Melchior, now U.S. Pat. No. 3,988,894 which describes, by way of example, throttle means comprising a throttle member which determines a constricted flow cross-section for air in the by-pass pipe and is subjected to a force proportional to the pressure difference and thus acts as a combined throttle and control means in cooperation with other means sensitive to the upstream or downstream pressure. The throttle member is not balanced.

A system of this kind is the easiest to build and is satisfactory in most cases. However, since the same element is used for control and throttle purposes, owing to the use of a non balanced throttle element, disadvantages occur in certain units and/or under certain operating conditions.

The throttle assembly consisting of the member and the associated control means constitute a mechanical oscillator. In some units and under certain operating conditions, the oscillator may resonate. Undesirable vibration of the throttle means may result in destruction thereof and the air stream flowing through it becomes unstable and may cause the compressor to surge and the flame in the combustion chamber to be blown out.

In addition, it is hardly possible to change the transfer function of that oscillator, since the control and throttle operations are combined, as will now be seen. The pressure drop $\Delta P$ generated by the throttle means is substantially linear:

$$\Delta P = \alpha P + \beta$$

The coefficient $\beta$ can be modified by a small amount by adjusting a spring which exerts a biasing force on the control means. The coefficient $\beta$ can for instance be varied, by subjecting the spring to the pressure P upstream of the throttle means e.g. using a movable stop which modifies the return force of the spring and is moved in dependence on the pressure. On the other hand, it is difficult to adjust the coefficient $\alpha$ in dependence on an operating parameter of the power unit.

If the compressor has a complicated surge line (e.g. axial multi-stage compressors), the operating line of the turbo-compressor cannot be made to pass through the optimum efficiency points if the pressure drop is a linear function of the compressor output pressure. Last, the fact that the throttling and control actions are combined implies that the amount of actuating force is dependent on the transversal size of the throttle element. The forces acting on the control element cannot be increased except by increasing the dimensions of the throttle element, and the size may become prohibitive.

SUMMARY OF THE INVENTION

It is an object of the invention to overcome such short comings. To this end, it provides a power unit wherein the throttle means comprise a movable member which meters the air flow cross-sectional area and on which the pressure difference does not exert any appreciable force tending to modify its position (i.e. which is air balanced), the power unit comprising in addition separate control means operatively coupled to the movable element.

This feature is contrary to the conception which a person skilled in the art would normally select, since such a person would normally avail of the fact that the pressure difference is available across the throttle member for producing a force actuating the member, in cooperation with a piston or diaphragm mechanically connected to the throttle member and acted upon by the pressure upstream or downstream of the throttle element.

Since the pressures do not exert any action on the throttle member which tends to move it, there is an additional advantage: the control means can be any of different types. They can be pneumatic, e.g. they can consist of an assembly comprising two movable or deformable elements having different effective surfaces subjected to the upstream and downstream pressures; they can comprise a power element controlled by a pilot system sensitive to the pressures upstream and downstream of the throttle element; they can comprise an electric actuator controlled responsive to signals received from transducers.

The pressure difference can be varied according to different laws with respect to the upstream pressure, inter alia linearly, but with the proportionality coefficient and/or the constant term being modified as a function of an operating parameter of the unit, e.g. for the operating line to avoid irregularities in the surge line of the turbocompressor.

It may be useful to recall that the throttle means described by way of examples in the aforementioned application Ser. No. 437,748 produce a pressure drop Δ P varying with the upstream pressure linearly as follows:

$$\Delta P = \alpha P + \beta$$

As long as $\beta$ is small compared with $\alpha$ P, i.e. provided the supercharging rate is high, this function expresses the fact that the ratio between the expansion ratio in the turbine and the compression ratio in the compressor is maintained at a substantially constant value. In the case of a single-stage turbocompressor, this function is usually the most favourable since it corresponds to a physical fact, i.e. the need to drive the turbine by the engine exhaust gases when the auxiliary combustion chamber (if any) is idling. The actual linear function may be modified to allow for variations in certain parameters influencing engine operation, and the aforementioned patent application Ser. No. 437,748 describes adjusting means for achieving this result.

In certain power units, inter alia in those comprising a multi-stage compressor, with intermediate cooling if required, the turbocompressor surge line may show considerable irregularities. In such cases, if the throttle means used are such that the pressure difference varies in linear manner, it may be necessary to operate in an efficiency region which is relatively distant from the optimum, so as to avoid passing through a surge "notch" under certain operating conditions. The invention makes it possible to select a function which is non-linear or quasi-linear (the constant coefficient or coefficients being automatically adjusted in response to an operating parameter, such as the compressor outlet pressure), so that operation is always near the surge line and therefore with high efficiency.

The control means can comprise movable or deformable active means having surfaces, at least one of which is subjected to the pressure upstream of the cross-sectional area metering member and at least another surface of which is subjected to the pressure downstream of the metering member, the surface and means operatively connecting them to the adjusting elements being such that a force is exerted on the member in the closing direction when the pressures upstream and downstream tend to become equal. For example, the assembly may be a non-deformable movable assembly actuated by fluid pressure and mechanically connected to the movable adjusting member.

The invention will be better understood from the following description of embodiments thereof given by way of examples only, with reference to the accompanying drawings.

SHORT DESCRIPTION OF THE DRAWINGS

FIG. 1 is a block diagram of a power unit;

FIG. 2 is a sketch showing the construction of the throttle means in the unit in FIG. 1 on an enlarged scale;

FIG. 3 shows a modified embodiment of the throttle means in FIG. 2;

Figure 5:
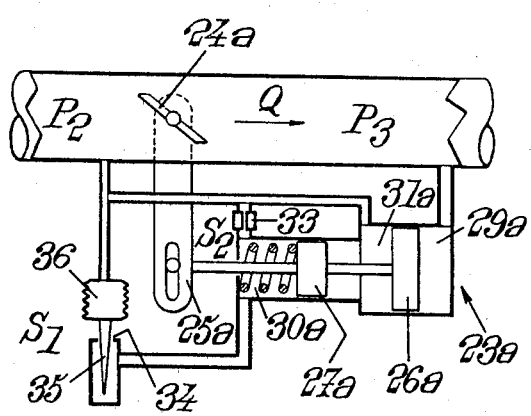
Figure 6:
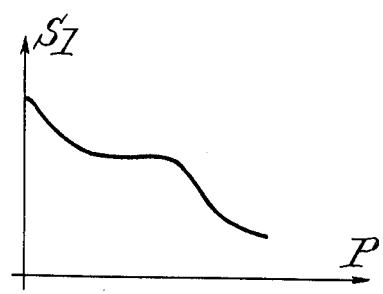
Figure 7:
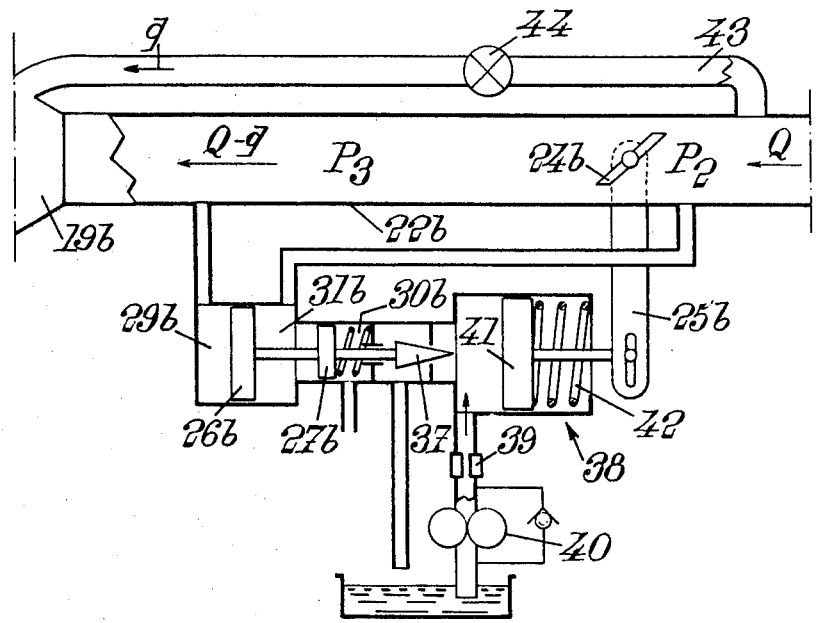
Figure 8:
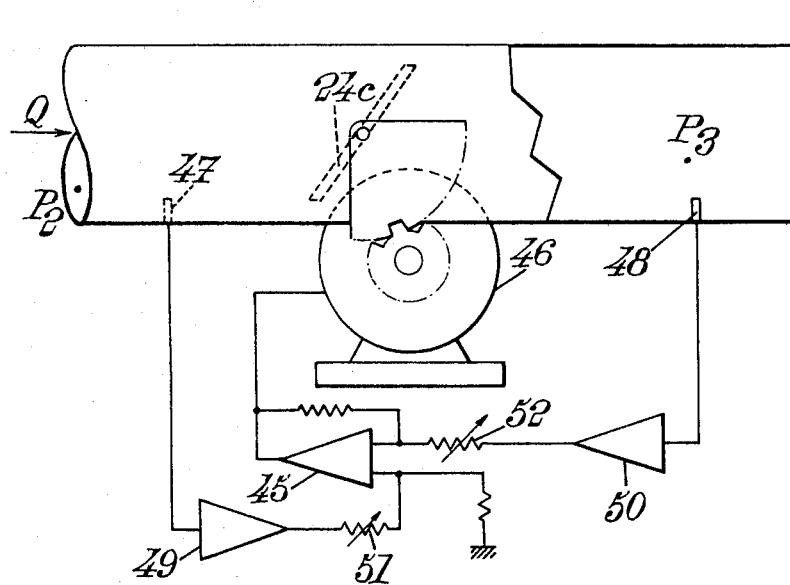
Figure 9:
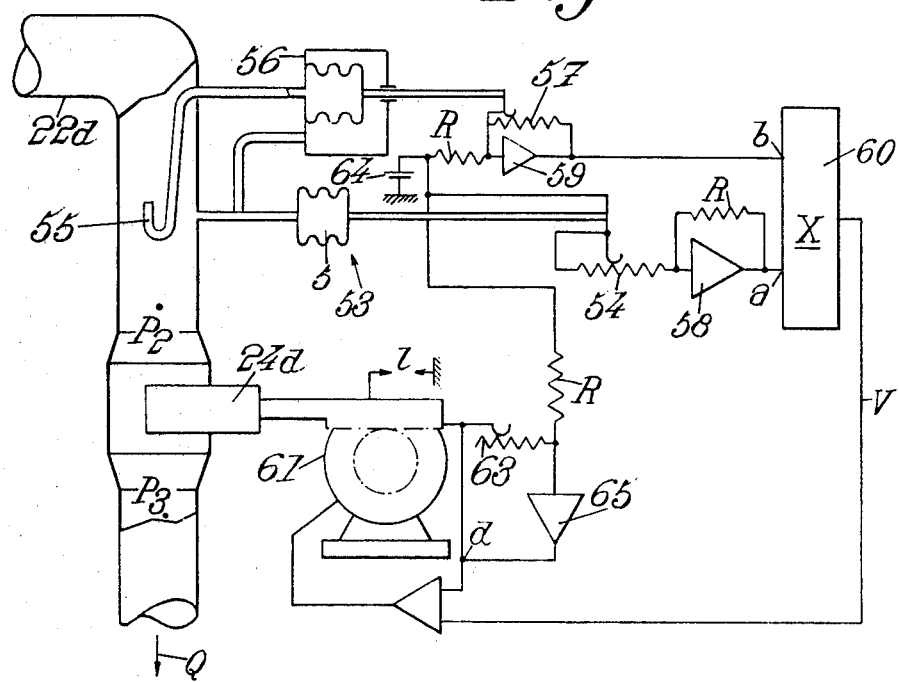
Figure 10:
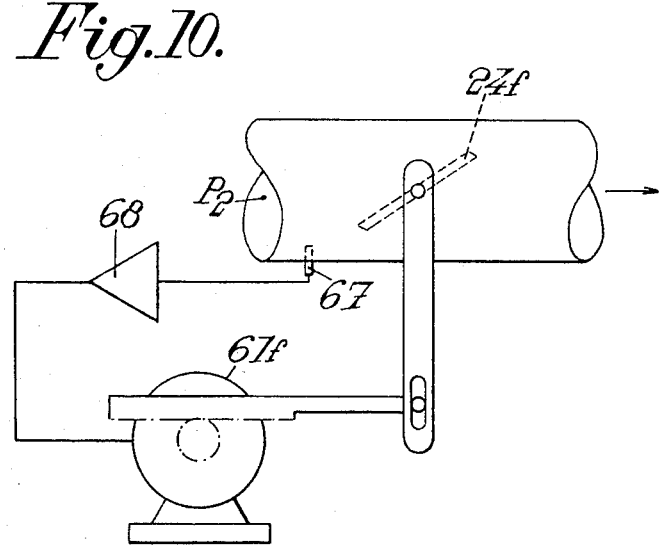

FIG. 5 similar to FIG. 2, shows a modified embodiment, whereby Δ P can be varied in quasi-linear manner but with coefficients dependent on the value of the compressor outlet pressure;

FIG. 6 is a curve representing the leak cross-section provided by an adjusting nozzle in dependence on the compressor outlet pressure;

FIG. 7, similar to FIG. 2, shows a hydraulically controlled alternative embodiment;

FIG. 8 is a block diagram of electrically controlled throttle means for use in the power unit in FIG. 1;

FIG. 9 is a block diagram of an electrical system wherein the position of the throttle member is controlled in dependence on the engine operating parameters; and FIG. 10 is a block diagram of an electrical unit for programmed adjustment of the position of the throttle member, for use inter-alia in a ship propulsion unit provided with a constant-pitch propeller.

DESCRIPTION OF PREFERRED EMBODIMENTS

Referring to FIG. 1, the power unit comprises an internal combustion engine 10; hereinafter, it will be assumed that the engine is a reciprocating-piston four-stroke Diesel engine having a low volumetric ratio (less than 12). However, the engine may be of any kind, having variable-volume or expansible combustion chambers, either with pistons or rotors, having any volumetric ratio, compression or spark ignited.

Engine 10 is supercharged by a turbocompressor comprising a turbine 11 and a centrifugal compressor 12, the rotors of which are connected by a shaft 13. An electric starting motor (not shown) connected to the shaft via a clutch can be located in the air inlet of compressor 12. Compressor 14 typically has a high compression ratio, above 6. Such ratios can be obtained with existing single-stage supersonic centrifugal compressors. A compressor having two or more stages or comprising several casings with an intermediate cooler, either centrifugal or axial, can be used if higher ratios are desired (10 or more). An auxiliary combustion chamber 19 provided with a fuel supply 20 is adapted to reheat the engine exhaust gases coming from manifold 21 before they enter turbine 11. The flow rate of injected fuel is adjusted by a control system 15 adapted to prevent the engine inlet pressure from falling below a minimum value corresponding to the self-ignition limit.

A by-pass pipe 22, which is open during operation of the power unit, is provided so that the air supplied by compressor 12 and not absorbed by the engine 10 can flow to the turbine. In the embodiment shown, pipe 22 connects the upstream end of an air cooler 17, disposed in the inlet manifold 18, to an auxiliary combustion chamber 19. Throttle means 23 maintains a pressure drop $\Delta P = P_2 - P_3$ in the air travelling along pipe 22 towards chamber 19, the pressure drop being substantially proportional to the compressor outlet pressure $P_2$ and independent of the flow rate through pipe 22.

Throttle means 23 illustrated in FIGS. 1 and 2 can be regarded as comprising a throttle member 24 and separate control means. In the embodiment shown, the throttle member 24 is balanced and comprises a butterfly valve carried by a shaft extending through the pipe wall and secured to a control lever 25. Other balanced elements, such as a cylindrical valve or guillotine valve, could be used.

Referring to FIG. 2 the control means comprise a cylinder locating a movable assembly connected to lever 25. The assembly comprises a large-diameter piston 26 and a small diameter piston 27 connected by a rod 28. The pistons are slidably sealingly received in the cylinder, in which they limit three chambers. The outer surface of piston 26 and the cylinder wall bound a chamber 29 which is connected to that part of pipe 22 disposed downstream of member 24 (or directly connected to the inlet of turbine 11). The outer surface of piston 27 and the cylinder wall cooperate to bound a chamber 30 connected to that part of pipe 22 disposed upstream of the throttle element 24. The intermediate chamber 31 is connected to atmosphere and the atmospheric pressure $P_0$ prevails in chamber 31.

A return spring 32 disposed in chamber 30 subjects the movable assembly to a small, substantially constant force F tending to open element 24. If S and s denote the areas of pistons 26 and 27 which are subjected to air pressure, the throttle means illustrated in FIG. 2 maintain a pressure drop P in the air travelling through pipe 22, according to the formula:

$$\Delta P = P(S - s)/S - (F + P_0(S-s))/S \qquad (2)$$

which is a linear function.

The system illustrated in FIG. 2 can be reversed, chamber 31 being connected upstream of element 24 and chamber 30 being connected to atmospheric pressure $P_0$. Formula (2) then becomes:

$$\Delta P = P_2 s/S - (F + P_0 s)/S$$

In both cases the relation is linear only as long as the flow rate is less than the value at which the correct pressure drop would correspond to a degree of opening of member 24 greater than its maximum opening.

In FIG. 3, where elements corresponding to those in FIG. 2 are designated with the same reference numerals, the areas on pistons 27, 26 subjected to pressures $P_2$ and $P_3$ are equal, but piston 27 acts on throttle member 24 with a smaller lever arm than piston 26. Different effective areas and lever arms could be used.

Figure 4:
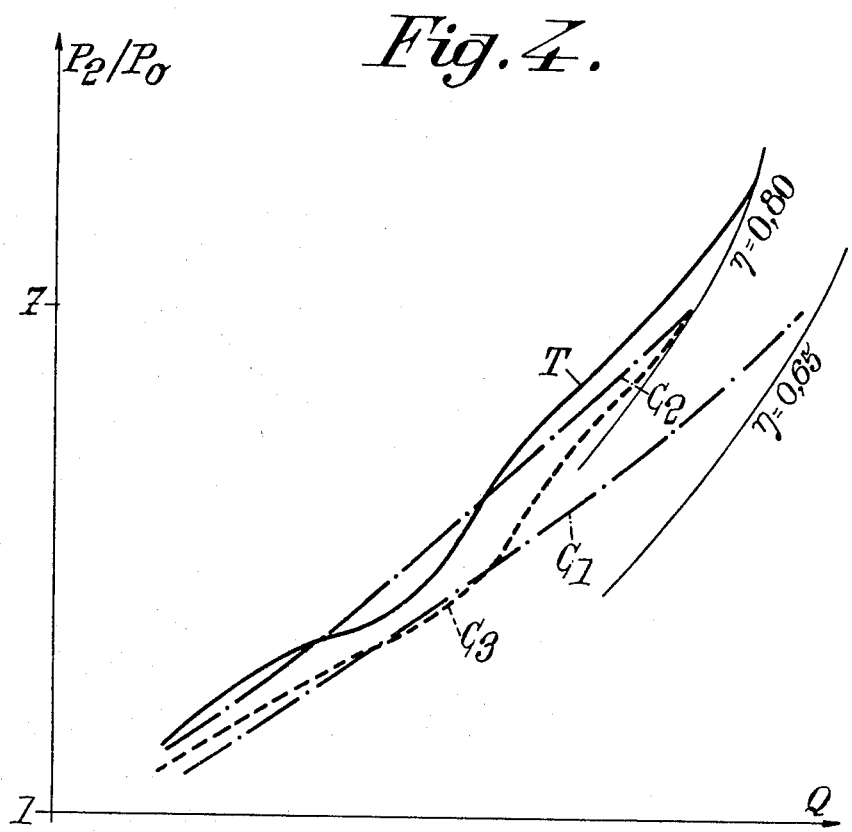
FIG. 4 is a diagram showing the surge curve of a typical turbocompressor and the characteristics provided by different throttle means in a power unit according to the invention.

In order more clearly to outline a problem which existed in the past and can be overcome easily by the invention, there is shown at FIG. 4 the surge line T (rate of flow delivery vs. pressure) of an existing turbocompressor. If the throttle member provides a pressure drop which is a linear function of the pressure, a choice must be made between two possibilities:

Either the characteristic $C_1$ is selected; this results in poor matching at full power and resulting low efficiency $\eta$ (since gas temperature is too high at the turbine inlet), or characteristic $C_2$ is selected; then surging occurs at intermediate operating conditions.

To escape from this dilemma, the pressure drop must be varied non-linearly as a function of pressure; this can be done by providing a characteristic such as $C_3$, which closely follows the surge line without crossing it. For that purpose, throttle means of the kind illustrated in FIG. 5 may be used, whereby the rate of variation of the pressure drop can be modulated in dependence on the pressure $P_2$.

Referring to FIG. 5, where those elements which correspond to those in FIG. 2 are given the same reference number with the subscription a attached thereto, chamber 31a is connected to the by-pass directly upstream of the throttle member 24a an is thus at pressure $P_2$. Chamber 30a is subjected to a pressure $P_1$ intermediate between pressure $P_2$ and atmospheric pressure $P_0$. To this end, chamber 30a is connected to pressure $P_2$ via a restrictor 33 having a cross-sectional area $S_2$ and to pressure $P_0$ via a restrictor 34 having a cross-sectional area $S_1$. The pressure $P_1$ between the restrictors is a function of pressure $P_2$ and of the ratio $S_1/S_2$ between the cross-sectional areas. As a first approximation:

$$P_1 - P_0/P_2 - P_0 \simeq k\, S_1/S_2$$

or:

$$P_1 = k\,(S_1)/S_2\, P_2 + P_0[1 - k(S_1)/S_2]$$

then the pressure drop produced by the throttle means of FIG. 5 can be written:

$$\Delta P/P_2 - (P_1 + F/s) = s/S$$

Finally:

$$\Delta P = s/S\,[1 - k\,(S_1/S_2)]\cdot P_2 - s/S\cdot(P_o + F/s)\cdot[1 - (k\,S_1)/S_2]$$

or:

$$\Delta P = \alpha\,(S_1/S_2)\cdot P_2 + \beta\,(S_1/S_2).$$

($\alpha$ and $\beta$ being constant values).

The cross-sectional areas $S_1$ and/or $S_2$ are controlled by one or more engine operating parameters, which are to be taken into account in modifying the coefficients of the linear function (2). Referring to FIG. 5, restrictor 33 has a constant cross-sectional area $S_2$ whereas restrictor 34 has a flow cross-sectional area $S_1$ which depends on the pressure $P_2$. To this end, restrictor 34 consists of the annular clearance between the edge of an aperture in a stationary casing and a tapered control needle 35 having a suitable outline and carried by the movable wall of a pressure capsule 36. The longitudinal cross-section of needle 35 and the characteristics of capsule 36 (i.e. variation in length plotted vs. pressure $P_2$) are e.g. such that the cross-section varies with pressure according to the curve illustrated in FIG. 6. As can be seen, successive variations can be made in coefficients ($\alpha$) or ($\beta$) of formule (1) hereinbefore, in dependence on pressure and in accordance with any desired function.

A number of restrictors could be placed in parallel, the cross-sectional areas thereof being variable in dependence on different control or operating parameters.

For varying coefficient $\beta$ independently of coefficient $\alpha$ in equation (1), it is sufficient that the thrust member against which the return spring bears, be movable in dependence on the desired operating parameter of the engine.

If, for example, it is desired to vary in dependence on the pressure $P_2$, spring 30 can be replaced by a spring 30e (in chain-dotted lines in FIG. 2) bearing against a thrust member consisting of a piston 69 acted upon by pressure $P_2$.

In the embodiments in FIGS. 2, 3 and 5, the force for moving the throttle means is provided by the air pressure in pipe 22. For obtaining an increase of the control forces, it may be advantageous to actuate the throttle member via a power element, the pressures upstream and downstream of the throttle member acting on a drive or pilot system only. A device of this kind is illustrated in FIG. 7, where elements similar to those previously described are denoted by the same reference number with the subscript b attached thereto.

Referring to FIG. 7 the throttle means comprises a drive or pilot system, the construction of which is similar to that of the control means in FIG. 5, except that the movable assembly is not operatively connected to lever 25b moving element 24b, but is connected to a needle 37 movable in a stationary nozzle so as to meter a flow cross-sectional area. The nozzle constitutes a leak path to a dump from an oil jack 38 which is permanently supplied, via restrictor 39 of constant cross-sectional area, by a constant pressure pump 40. The motion of needle 37 modifies the pressure in the jack and subjects a power piston 41 operatively connected to lever 25b to a force tending to close member 24b against the action of a return spring 42.

Instead of metering a flow cross-sectional area, the movable assembly can act on a suitable transducer, e.g. for converting motion into an electrical signal (e.g. on a potentiometer slide), in which case the throttle member 24b is controlled by an electric actuator.

While the throttle means comprise a balanced throttle member and separate control means, the advantageous characteristics of the systems described and claimed in patent application Ser. No. 437,748(now U.S. Pat. No. 3,988,894), and in a copending divisional application Ser. No. 721,576, filed Sept. 8, 1976 , i.e. the possibility of regulating the rate of flow in a branch pipe simply by varying a cross-sectional area is retained, while a conventional valve does not fulfill that object. By way of example, FIG. 7 shows a branch pipe 43 provided with a valve 44 for supplying the auxiliary combustion chamber 19b with a flow $q$ of primary air, the flow Q-$q$ of secondary air being supplied by pipe 22b. As long as an effective flow is travelling through pipe 22b and does not exceed the previously-defined maximum value, the flow $q$ in the branch can be regulated simply by acting on the open cross-sectional area of valve 44. The flow rate of primary air can be varied simply by maintaining the last mentioned cross-sectional area at a value fixed by the value of a control parameter (e.g. the pressure $P_2$).

All the previously-described embodiments are fluid pressure mechanical servo systems, either direct (FIGS. 2, 3 and 5) or with an amplification effect (FIG. 7). If it is desired to make the pressure difference vary in a complicated manner in dependence on the pressure, or if it is desired to have transfer functions for the action to be non-linear (for instance with an integrating or differentiating effect) an electrical solution may be more suitable. A device of this kind is shown in very simplified form in FIG. 8.

Referring to FIG. 8, there is shown a device arranged to produce a pressure drop varying in linear manner with the pressure $P_2$ which prevails upstream of the throttle member 24c. The drive comprises two transducer systems. The systems deliver voltages proportional to pressure $P_2$ and proportional to pressure $P_3$, respectively to the two inputs of a differential amplifier 45. The amplifier output is connected to an electric motor 46, e.g. a step by-step motor, driving the rotary throttle member 24c.

In the embodiment of FIG. 8, each transducer system comprises a pick-up probe 47 or 48 and a pre-amplifier 49 or 50. Each pre-amplifier is connected, via a resistor 51 or 52 respectively, to a corresponding input of amplifier 45. Motor 46 comes into a balance position at which the output of amplifier 45 is zero, corresponding to a pressure drop $\Delta P = P_2 - P_3$ such that:

$$k_2 P_2 - k_3 P_3 = 0,$$

(the coefficients $k_2$ and $k_3$ being adjustable by varying the values of resistors 51 and 52, respectively).

In the resulting servo system, the pressure difference is in direct proportion to the compressor outlet pressure, insofar as probes 47, 48 have linear characteristics. A return spring (not shown) can be provided, having the same function as in the embodiment in FIG. 2.

As indicated above, it may be advisable to vary $\Delta P$ is dependence on $P_2$ non-linearly so that the compressor matching line (the rate of flow delivery vs. outlet pressure) passes through points where the compressor efficiency is near the optimum. This line may have a complicated shape, particularly if the turbocompressor comprises a number of compressors in series with intermediate coolers, or is an axial multi-stage compressor. In such cases, the surge line T may have an irregular shape. This is easily dealt with by varying the values of resistors 51 and 52 (through which the input signals are applied to amplifier 45) in dependence on the parameter to be taken into account.

Last, in engines requiring scavenging (two-stroke engines in particular) it is advantageous to adjust the scavenging in dependence on the load in order to vary the amount of recycled gas. The scavenging ratio is determined by the ratio $P_2/P_3$; an additional resistor, the value of which varies in dependence on the load, can be placed in series or in parallel relation with at least one of the resistors 51 and 52. Idling and low-load operation may be improved in that way.

More generally, the amplifiers can have any desirable transfer function, e.g. proportional, square law integral or derivative action.

All the aforementioned embodiments comprise a servo circuit for varying the pressure difference in accordance with the pressure in the by-pass pipe, the variation being either direct (FIGS. 2, 3 and 5) or amplified (FIGS. 7 and 8). Alternately, the position of the movable throttle member can be servo controlled or even programmed in dependence on various engine operating parameters, provided that there is a one to one relation between the pressure difference produced by the movable member and the degree of opening of the member plus the various parameters taken into consideration. Usually, this method is less satisfactory regarding performance, but may lead to a simpler device.

In practice, use is made of an analog computer system which varies the position of the movable throttle means in dependence on:

a first input variable, i.e. the pressure upstream or downstream of the movable element, and a second input variable representing the ratio between the flow rate in the by-pass pipe and the total flow delivered by the compressor (the second input may be deduced from several operating parameters such as engine speed, inlet temperature, turbocompressor speed and engine speed, flow rate of air in the by-pass pipe and temperature of the air, compressor flow rate and flow rate into the by-pass pipe, pressure $P_2$ and temperature on the air travelling along the by-pass pipe, etc..).

By way of example, there is illustrated in FIG. 9 a device of this kind wherein the degree of opening of the movable throttle member 24d is metered by an electrical servo circuit, one input signal of which represents the pressure $P_2$ upstream of the throttle element, and an other input signal of which represents the flow rate Q of air through the by-pass pipe.

The throttle member 24d is a slide valve movable at right angle to the axis of pipe 22d. Hereinafter, it will be assumed that the cross-sectional shapes of valve 24d and of the portion of pipe in which it moves are adapted so that the effective flow cross-sectional area $\sigma$ offered to the air varies in dependence on the movement $l$ of the slide valve from its fully open position according to the law:

$$\sigma = \sigma_0 (l/l_0)^{\frac{1}{2}} \qquad (3)$$

($\sigma_0$ and $l_0$ being constants).

A law of variation of this kind renders the design of servo system easier but is not necessary.

Since the pressure drop during turbulent flow conditions is substantially proportional to the square of the ratio of the mass flow to the flow cross-section, the flow cross-section $\sigma$ required for producing the pressure difference $\Delta P$ is:

$$\sigma = Q (\lambda/\rho \cdot \Delta P)^{\frac{1}{2}} \qquad (4)$$

(where $\lambda$ is substantially constant).

The device of FIG. 9 comprises a pressure pick-up probe comprising a capsule 53 connected to the by-pass upstream of member 24d and moving the slide of a potentiometer 54 for its resistance to be substantially proportional to $P_2$. An information signal representing the flow rate is provided by a Pitot tube 55 disposed in the flow and associated with a differential pick-up 56. The difference $\pi$ between the static pressure and the outlet pressure of the Pitot tube has the form:

$$\pi = k Q^2/\rho \qquad (5)$$

($k$ being a constant, Q being the mass flow and $\rho$ being the specific weight of air).

The capsule of pick-up 56 actuates a potentiometer 57, the resistance of which is substantially proportional to $Q^2/\rho$.

The potentiometers 54, 57 are respectively located in the input circuits of operational amplifiers 58, 59 whose outputs are connected to an analog multiplying circuit 60.

A reversible actuator 61 simultaneously drives element 24d and the slide of a potentiometer 63, the resistance of which is substantially proportional to the amount of the movement $l$ of the throttle member. Potentiometer 63 is disposed in the input circuit of an operational amplifier 65. The output voltages of amplifier 65 and analog multiplier 60, respectively, are supplied to respective inputs of a differential amplifier 66, whose output voltage is supplied to actuator 61.

The operation of the system in FIG. 9 results from the preceding description.

Operational amplifier 58 supplies a voltage $v_a = v \cdot R/A \cdot P_2$ where $v$ is the constant voltage supplied by the source 64, R is a fixed resistance and A is a constant.

The operational amplifier 59 supplies a voltage $$v_b: v_b = v \cdot B \cdot Q^2/\rho/R \; (B = \text{constant})$$

The output voltage V of the analog multiplier 60 is therefore:

$$V = C \, v^2 \cdot Q^2/\rho/P_2 \, (C = \text{constant})$$

The operational amplifier 65 supplies a voltage $$v_d: v_d = v \cdot D \cdot l/l_0/R \; (D = \text{constant})$$

The output voltage of the differential amplifier 66 is therefore:

$$v_d - V = v \cdot D/R \, [l/l_0 - R \cdot C/D \cdot v \, Q^2/\rho/P_2]$$

Actuator 61 is moved until the last-mentioned voltage is zero, i.e. until:

$$l/l_0 = R \cdot C/D \cdot v \cdot Q^2/P_2 \qquad (6)$$

The balance position of member 24d will be such that, by (3) and (4), the resulting pressure drop is:

$$\Delta P = \lambda \cdot Q^2/\rho/\sigma^2 = \lambda/\sigma_o^2 \cdot Q^2/\rho/l/l_o$$

Finally, in accordance with the balance relation (6)

$$P = \lambda/\sigma_o^2 \cdot D/R.C.V. \cdot P_2 = \alpha P_2 \, (\alpha \text{ constant}).$$

As can be seen, this position servo circuit gives the desired result, i.e. the pressure drop is proportional to the upstream pressure irrespective of the flow rate through the throttle means.

The position servo system can be simplified if there is a one-to-one relation between the engine speed and the pressure $P_2$, i.e. if the flow rate along the bypass pipe depends on pressure $P_2$ only. In this case, the position of the movable throttle element 24d can be adjusted by an open-loop servo circuit having a single input signal, i.e. the pressure $P_2$. This applies inter alia to a constant speed motor (e.g. for driving an A.C. electricity generator), a constant power drive motor (i.e. a motor operating so that the product of the torque and the speed remain constant), or a motor coupled to a constant pitch propellor or pump, where the ratio of the torque to the square of the velocity is substantially constant.

By way of example, FIG. 10 shows an electrically actuated control circuit for a ship propulsion unit; the circuit consists of a pressure pick-up 57 which feeds a transducer causing each value of pressure $P_2$ to correspond to a given position of a member 24f adjusting a cross-sectional area. Each area corresponds to a pressure drop which is determined by this position alone, in accordance with a predetermined function. The transducer circuit can comprise an amplification circuit 68 for forming the appropriate transfer function and actuating an actuator 61f.

Numerous other embodiments of the invention are possible, as well as numerous applications. Reliability in operation is achieved even in the case of small, fast engines which draw air at a flow rate which is variable very rapidly and over wide ranges. The invention is applicable for instance to propulsion motors for land vehicles, engines for devices used in civil engineering or agriculture, naval propulsion engines using a constant or variable pitch propeller, engines driving compressors and electricity generating sets.

We claim:

1. A power unit comprising an internal combustion engine of the expansible chamber type, supercharged by a turbocompressor unit comprising at least one compressor and at least one turbine for driving said compressor, said turbine being connected to receive the engine exhaust gases, bypass means communicating the output of said compressor to the inlet of said turbine, and automatically controlled throttle means comprising an air pressure balanced movable member whose position determines the gaseous flow cross-sectional area in a section of said bypass means and separate control means operatively coupled to said movable member for adjusting the position of the latter, said balanced member being movable through a range of such positions to vary said area in a manner such that the pressure drop produced in said bypass means is an increasing function of the pressure in said bypass means and said pressure drop is substantially independent of the gaseous flow rate through said bypass means.

2. A power unit according to claim 1, wherein said control means comprise movable multiple surface means subjected to gas pressure in said bypass means, at least one of which is subjected to the pressure which prevails upstream of said movable member and at least another of which is subjected to the pressure which prevails downstream of said movable member, and a mechanical linkage connecting said surface means and movable member, the areas of said surface means and said linkage being so dimensioned and arranged that a force is exerted on said balanced movable member tending to close it when the pressure upstream and downstream of said member tend to become equal in operation.

3. A unit according to claim 2, wherein said control means comprise a movable assembly actuated by fluid pressure and mechanically coupled to said movable member for adjusting said flow cross-sectional area.

4. A unit according to claim 3, wherein said movable assembly comprises two pistons having surface areas bounding three chambers in casing means, one chamber being connected to the pressure which prevails downstream of said movable member, another chamber being connected to the pressure which prevails upstream of said movable member and the third chamber being subjected to a reference pressure, the largest acting surface being subjected to the pressure conditions downstream of said movable member.

5. A unit according to claim 4, wherein the reference pressure is atmospheric pressure.

6. A unit according to claim 4, wherein the reference pressure is intermediate between the atmospheric pressure and the pressure upstream of said movable element, said control means including an air leak circuit including a path connected from the bypass means to atmosphere and having two restrictors disposed in series relation in said path and defining a source of said reference pressure therebetween, at least one of said restrictors having a cross-sectional area varied in dependence of an operating parameter of the unit, and means communicating said path between said restrictors with said chamber.

7. A unit according to claim 6, including a component mounted for movement in said one restrictor along a direction and having a cross section which is variable along said direction to thereby vary the flow cross-sectional area in said one restrictor in response to the position of said component in said one restrictor, said component being connected to an element whose position is controlled in dependence on the pressure in said bypass means.

8. A unit according to claim 3, wherein said movable assembly is connected to hydraulic damping means.

9. A unit according to claim 3, wherein said movable assembly is operatively associated with a return spring which tends to move said movable assembly in a direction which produces the opening movement of said movable member.

10. A unit according to claim 9, wherein said return spring has an abutting connection with a thrust member which is subjected to the pressure in said by-pass means and which exerts on the spring a compression force in dependence on the pressure in said by-pass means.

11. A unit according to claim 2, wherein said control means comprise pilot means subjected to the pressure upstream of the movable member, to the pressure downstream of the movable member and to a reference pressure, and power means drivably connected to said movable member and controlled by said pilot means.

12. A unit according to claim 11, wherein said power means comprises a fluid jack receiving a fluid at a pressure controlled by said pilot means.

13. A unit according to claim 1, wherein the position of said movable member is adjusted in response to the pressure at a point in said by-pass means and to a signal representing the ratio between the flow rate of air delivered by the compressor and the flow rate of air taken in the engine.

14. A unit according to claim 1, wherein there is a one-to-one relation between the pressure supplied by said compressor and the speed of said engine and the position of said movable member is controlled by programmed computer means, the input signal of which is the pressure at a point in said bypass means.

15. A power unit comprising an internal combustion engine of the of the expansible chamber type; a supercharging turbocompressor unit whose turbine is connected to receive the exhaust gases of said engine; bypass means communicating the output of said compressor to the inlet of said engine and arranged to pass to said turbine any amount of air flow delivered by said compressor which is not taken by said engine; and automatically controlled throttle means for impressing to the air flow in said bypass means a pressure drop which is a predetermined increasing function of the pressure existing at the compressor outlet and substantially independent of the flow rate of the air traversing said bypass means, wherein said throttle means comprise an air flow balanced throttle member mounted for movement in said bypass means and defining a variably throttle flow cross section, electric actuator means operatively connected to said throttle member for adjusting the position thereof, and control means responsive to signals received from means sensing the pressure in said bypass means for energizing said actuator means in a direction which modifies the setting of said throttle member until it impresses to the air flow traversing said flow cross section a pressure drop corresponding to said function.

16. A power unit according to claim 15, including sensing means providing signals representative of the pressures upstream and downstream of the movable throttle member.

17. A power unit comprising an internal combustion engine of the expansible chamber type; a supercharging turbocompressor unit, the compressor means of which has a non-linear surge line characteristic and whose turbine means is connected to receive the exhaust gases of said engine; bypass means communicating the output of said compressor means to the inlet of said engine and arranged to pass to said turbine means any amount of air flow delivered by said compressor means which is not taken by said engine; and automatically controlled throttle means for impressing to the air flow in said bypass means a pressure drop which is a predetermined increasing function of the pressure existing at the compressor means outlet and substantially independent of the flow rate of the air traversing said bypsss means, wherein said throttle means comprise an air flow balanced throttle movable member mounted for movement in said bypass means and defining a variably throttled flow cross section and control means operatively connected to said movable member and arranged to adjust the position of said movable member to provide a pressure drop which is a non-linear function of the pressure in said bypass means so selected that said compressor means always operates near its surge line to optimize the efficiency of said compressor means.

* * * * *

UNITED STATES PATENT AND TRADEMARK OFFICE
CERTIFICATE OF CORRECTION

PATENT NO. : 4,089,173
DATED : May 16, 1978
INVENTOR(S) : Jean Melchior and Thierry Andre It is certified that error appears in the above-identified patent and that said Letters Patent are hereby corrected as shown below:

Claim 2, line 24, change "pressure" to -- pressures --

Claim 15, line 44, change "throttle" to -- throttled --

Signed and Sealed this

Seventeenth Day of October 1978

[SEAL]

Attest:

RUTH C. MASON
Attesting Officer

DONALD W. BANNER
Commissioner of Patents and Trademarks